United States Patent
Bender et al.

(10) Patent No.: US 8,776,925 B2
(45) Date of Patent: Jul. 15, 2014

(54) MOTOR VEHICLE

(75) Inventors: Stefan Bender, Ludwigsburg (DE); Guan Chew, Bietigheim-Bissingen (DE); Steffen Maurer, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/365,379

(22) Filed: Feb. 3, 2012

(65) Prior Publication Data

US 2012/0199406 A1    Aug. 9, 2012

(30) Foreign Application Priority Data

Feb. 3, 2011    (DE) .................. 10 2011 000 482

(51) Int. Cl.
    *B60R 16/04*    (2006.01)
(52) U.S. Cl.
    USPC ........................ 180/68.5; 180/69.1
(58) Field of Classification Search
    USPC ............... 180/65.1, 65.21, 68.5, 69.1, 69.22, 180/69.23, 68.6; 446/431, 439
    See application file for complete search history.

(56) References Cited

U.S. PATENT DOCUMENTS

| | | | | |
|---|---|---|---|---|
| 1,993,893 | A * | 3/1935 | Page, Jr. ..................... | 429/96 |
| 4,044,852 | A * | 8/1977 | Lewis et al. ................ | 180/206.4 |
| 4,365,681 | A * | 12/1982 | Singh .......................... | 180/68.5 |
| 5,305,513 | A * | 4/1994 | Lucid et al. ................ | 29/402.08 |
| 5,641,031 | A | 6/1997 | Riemer et al. | |
| 6,189,636 | B1 * | 2/2001 | Kikukawa ................... | 180/68.5 |
| 7,610,978 | B2 * | 11/2009 | Takasaki et al. ........... | 180/68.5 |
| 2008/0071483 | A1 * | 3/2008 | Eaves .......................... | 702/63 |
| 2010/0071979 | A1 * | 3/2010 | Heichal et al. ............. | 180/68.5 |

FOREIGN PATENT DOCUMENTS

| | | |
|---|---|---|
| DE | 44 12 450 | 10/1995 |
| EP | 1 550 574 | 7/2005 |

* cited by examiner

*Primary Examiner* — Hau Phan
*Assistant Examiner* — Bryan Evans
(74) *Attorney, Agent, or Firm* — Gerald E. Hespos; Michael J. Porco; Matthew T. Hespos

(57) ABSTRACT

A motor vehicle has an electrical drive machine that is supplied with electrical energy by an electrical energy storage device, and has an underbody region or surface (5). The electrical energy storage device is accessible for maintenance and/or installation work via a maintenance cover (10) in the underbody surface (5) to reduce time required for maintenance and/or installation work.

8 Claims, 1 Drawing Sheet

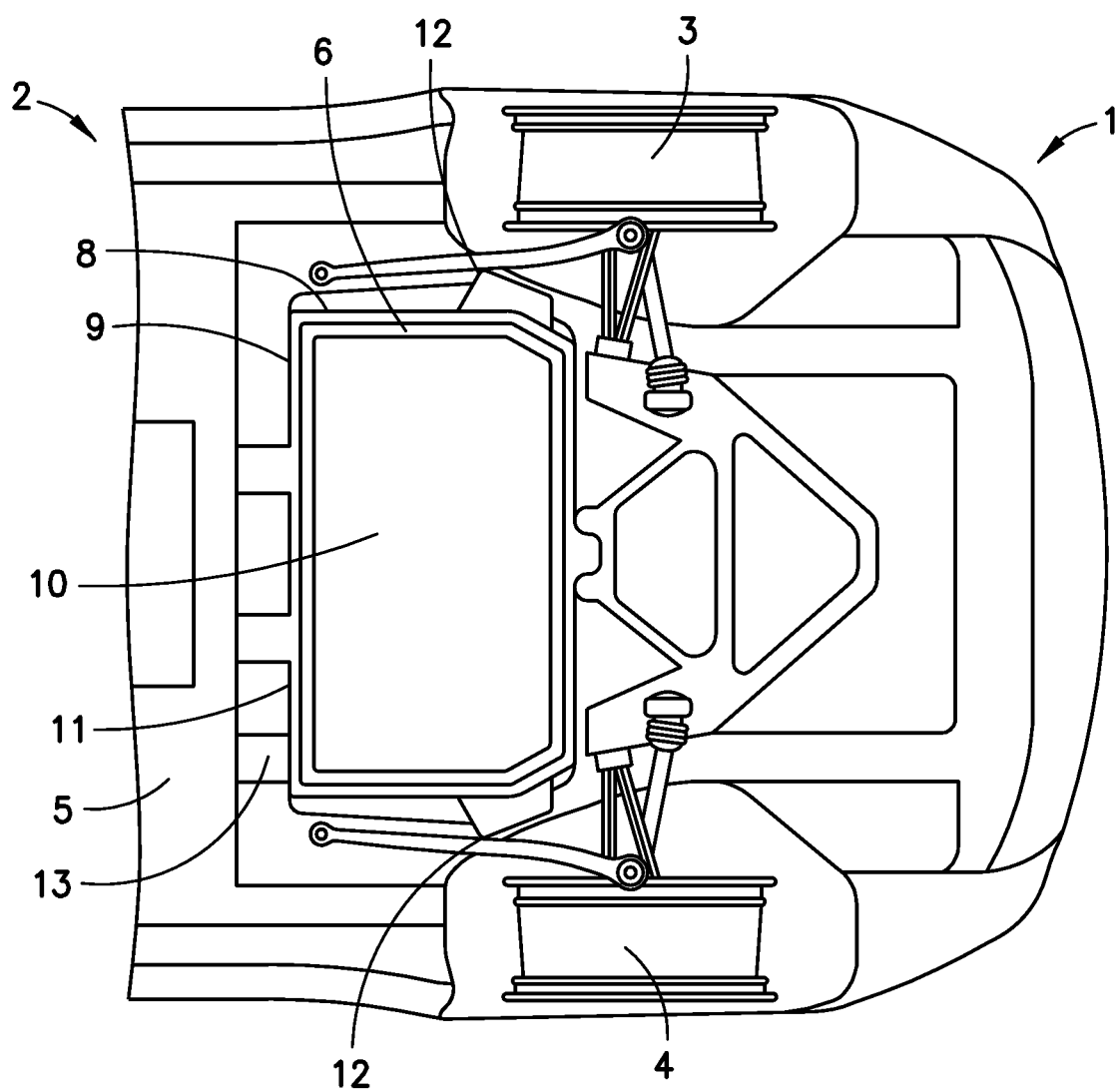

MOTOR VEHICLE

CROSS REFERENCE TO RELATED APPLICATION

This application claims priority under 35 USC 119 to German Patent Appl. No. 10 2011 000 482.3 filed on Feb. 3, 2011, the entire disclosure of which is incorporated herein by reference.

BACKGROUND OF THE INVENTION

1. Field of the Invention

The invention relates to a motor vehicle with an electrical drive machine that is supplied with electrical energy by an electrical energy storage device. The motor vehicle also has an underbody region.

2. Description of the Related Art

European patent application EP 1 550 574 A2 discloses a motor vehicle that has a fuel cell system box arranged on an underside of a floor of the motor vehicle. German laid-open specification DE 44 12 450 A1 discloses an electric vehicle that has a fuel cell system in an underbody that is arranged so that drive assemblies can be installed from below or through the floor of the passenger compartment. The floor of the passenger compartment or the underbody of the vehicle can have cutouts or maintenance flaps for installation or maintenance purposes.

The object of the invention is to reduce the time required to maintain or install an electrical energy storage device of a motor vehicle that has an electrical drive machine, which is supplied with electrical energy by an electrical energy storage device, particularly where the motor vehicle has an underbody region.

SUMMARY OF THE INVENTION

The invention relates to a motor vehicle that has an electrical drive machine that is supplied with electrical energy by an electrical energy storage device. The motor vehicle also has an underbody region and the electrical energy storage device is accessible for maintenance and/or installation work via a maintenance cover in the underbody region. Specific maintenance and/or installation work can be carried out on the electrical energy storage device without the electrical energy storage device having to be removed from the motor vehicle. More particularly, a maintenance cover is arranged in the region of the underbody of the motor vehicle and covers the electrical energy storage device at the bottom.

A maintenance opening in the underbody region preferably can be opened and closed repeatedly without the maintenance cover being destroyed. The maintenance cover closes the maintenance opening during normal operation of the motor vehicle. However, the maintenance cover can be opened or removed to open the maintenance opening in the underbody region for carrying out maintenance and/or installation work.

The electrical energy storage device preferably is arranged above the maintenance cover. Additionally, the electrical energy storage device preferably is attached to a supporting structure of the motor vehicle at a location so that at least part of the energy storage device is accessible through the maintenance opening from below.

The electrical energy storage device preferably is a traction battery or a high-voltage battery. A traction battery, which also is called a drive battery, is installed, as an energy supply means in vehicles that, at least partially, are driven electrically.

The electrical energy storage device preferably has a diagnosis interface which is accessible without opening or removing the maintenance cover. Contact can be made with the diagnosis interface at the electrical energy storage device to read, for example, a fault memory.

The maintenance cover may be a maintenance flap that is fit pivotally in the underbody region. The pivotal flap further facilitates maintenance and/or installation work on the electrical energy storage device in the installed state.

The motor vehicle may be a pure electric vehicle. Thus, the electrical drive machine may be the only drive machine of the motor vehicle. The electric vehicle may be a plug-in electric vehicle that can be charged at a power outlet of an electrical supply system.

The motor vehicle also may be a hybrid vehicle. In this case, a further drive machine, such as an internal combustion engine, is provided in addition to the electrical drive machine. The further drive machine can be used to drive the motor vehicle in addition to or instead of the electrical drive machine.

Further advantages, features and details of the invention are provided in the following detailed description of an exemplary embodiment with reference to the single drawing.

BRIEF DESCRIPTION OF THE DRAWING

FIG. 1 is a bottom view of a rear area of a motor vehicle with a maintenance cover according to the invention.

DETAILED DESCRIPTION OF THE PREFERRED EMBODIMENT

FIG. 1 illustrates the bottom of the rear 1 of a motor vehicle 2 that preferably is a pure electric vehicle or a hybrid vehicle. The motor vehicle 2 comprises two drive wheels 3, 4 that are driven by an electrical drive machine. Additionally, the motor vehicle 2 has an underbody surface 5 that may be formed by a sheet material. The electrical drive machine is supplied with energy by an electrical energy storage device 6.

The electrical energy storage device 6 is arranged in a receptacle 8 partially between the drive wheels 3, 4 in a rear region of the motor vehicle 2 in front of the rear axle and is attached to a supporting structure of the motor vehicle 2. The underbody surface 5 includes a maintenance opening 9 that provides access to the receptacle 8 from below and hence the maintenance opening 9 provides access to the electrical energy storage device 6 in the receptacle 8.

The maintenance opening 9 in the underbody surface 5 of the motor vehicle 2 can be closed by a maintenance cover 10 that preferably is hinged pivotally to the underbody surface 5 along a hinge line 11. A side of the maintenance cover 10 opposite the hinge line 11 includes selectively and repeatedly openable and closable locks 12. Thus, the maintenance cover 10 can be opened to carry out specific maintenance work on the electrical energy storage device 6 and closed securely upon completion of the work.

The electrical energy storage device 6 is a high-voltage battery and is equipped with a diagnosis interface 13 that is operatively associated with the electrical energy storage device 6 either by wires or wirelessly. The diagnosis interface 13 at the electrical energy storage device 6 is accessible from below without having to open the maintenance cover 10 and wired or wireless connection can be made with the diagnosis interface 13 to read a fault memory of the electrical energy storage device 6. As a result, the effort required for maintenance can be reduced considerably. In addition, maintenance can be performed more quickly than in conventional motor vehicles. Maintenance costs can be reduced as a result.

What is claimed is:

1. A motor vehicle driven at least partly by electrical energy, the motor vehicle comprising: a rear end; a rear axle in proximity to the rear end; two rear wheels driven by the rear axle; an underbody surface; a receptacle above the underbody surface, forward of the rear axle and at least partly between rear wheels of the motor vehicle; an electrical energy storage device attached to a supporting structure of the motor vehicle and disposed in the receptacle, the electrical energy storage device being operative for supplying the electrical energy for driving the motor vehicle; a maintenance opening in the underbody surface at the receptacle and being configured for accessing the electrical energy storage device in the receptacle for maintenance or installation work; and a maintenance cover pivotally attached to the underbody surface along a hinge line substantially adjacent the maintenance opening and at a side of the maintenance opening farthest from the rear axle and forward of the rear axle, the maintenance cover having a free end opposite the hinge line and disposed forward of the rear axle, the maintenance cover further having side edges extending from the hinge line to the free end, locks being disposed on the side edges of the maintenance cover substantially adjacent the free end and forward of the rear axle for locking the free end of the maintenance cover to the underbody surface, the maintenance cover being repeatedly movable between a closed position where the maintenance cover closes the maintenance opening and an open position where the free end of the maintenance cover is spaced from the maintenance opening for accessing the electrical energy storage device.

2. The motor vehicle of claim 1, wherein the electrical energy storage device is a traction battery or a high-voltage battery.

3. The motor vehicle of claim 1, further comprising a diagnosis interface operatively associated with the electrical energy storage device and disposed at the underbody surface for access without opening or removing the maintenance cover.

4. The motor vehicle of claim 1, motor vehicle is a pure electric vehicle.

5. The motor vehicle of claim 1, wherein the motor vehicle is a hybrid vehicle.

6. The motor vehicle of claim 1, wherein the hinge line is substantially parallel to the rear axle.

7. A hybrid or electric motor vehicle, comprising:
a rear axle;
rear wheels mounted on the rear axle;
an underbody surface;
a receptacle above the underbody surface and forward of the rear axle and at least partly between the rear wheels;
a traction battery attached to a supporting structure of the motor vehicle and disposed in the receptacle, the traction battery being operative for supplying electrical energy for driving the wheels of the motor vehicle;
a maintenance opening in the underbody surface at the receptacle and being configured for accessing the traction battery for maintenance while the traction battery is attached to the supporting structure of the motor vehicle and disposed in the receptacle;
a maintenance cover hingedly attached to the underbody surface along a hinge line substantially adjacent an end of the maintenance opening farthest forward of the rear axle, the maintenance cover having a free end opposite the hinge line and side edges extending between the hinge line and the free end, the maintenance cover being hingedly movable between a closed position where the maintenance cover closes the maintenance opening and an open position where the free end of the maintenance cover is spaced from at least a rear edge of the maintenance opening for accessing the traction battery, locks, on the side edges in proximity to the free end of the maintenance cover and forward of the rear axle for locking the free end of the maintenance cover to the underbody surface; and
a diagnosis interface at the underbody surface on the underbody surface of the vehicle in proximity to the maintenance opening and having a wired connection to the traction battery, the diagnosis interface being disposed for access without opening the maintenance cover.

8. The motor vehicle of claim 7, wherein the traction battery has a fault memory and the diagnosis interface is operative for reading the fault memory.

* * * * *